(12) United States Patent
Horiba et al.

(10) Patent No.: US 6,220,304 B1
(45) Date of Patent: Apr. 24, 2001

(54) BRAKE HOSE

(75) Inventors: Ryuichi Horiba, Hashima; Etsuko Kawai, Haguri-gun, both of (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/363,010

(22) Filed: Jul. 30, 1999

(30) Foreign Application Priority Data

Jul. 30, 1998 (JP) .................................................. 10-230341

(51) Int. Cl.$^7$ ....................................................... F16L 11/10
(52) U.S. Cl. ......................... 138/126; 138/141; 138/146
(58) Field of Search .................................. 138/124, 126, 138/141, 146

(56) References Cited

U.S. PATENT DOCUMENTS

| | | | |
|---|---|---|---|
| 3,793,130 | * 2/1974 | Marzocchi | 161/93 |
| 3,918,499 | 11/1975 | Higbee . | |
| 3,948,293 | * 4/1976 | Bixby | 138/126 |
| 4,212,327 | * 7/1980 | Haren et al. | 138/125 |
| 4,535,107 | * 8/1985 | Murase | 524/157 |
| 4,762,751 | * 8/1988 | Girgis et al. | 428/378 |
| 4,992,314 | * 2/1991 | Saitoh | 138/124 |
| 5,077,108 | 12/1991 | Ozawa et al. . | |
| 5,445,191 | 8/1995 | Green et al. . | |
| 5,526,848 | 6/1996 | Terashima et al. . | |
| 5,655,572 | * 8/1997 | Marena | 138/125 |
| 5,660,210 | 8/1997 | Ikeda et al. . | |
| 5,672,421 | * 9/1997 | Stanhope | 428/295 |

FOREIGN PATENT DOCUMENTS

| | | |
|---|---|---|
| 196 33 544 | 3/1997 | (DE) . |
| 1515564 | 6/1978 | (GB) . |
| 2304856 | 3/1997 | (GB) . |

* cited by examiner

*Primary Examiner*—James Hook
(74) *Attorney, Agent, or Firm*—Pillsbury Winthrop LLP

(57) ABSTRACT

A brake hose has an inner tube layer made from a rubber material, a lower thread layer made of braided lower threads, an intermediate rubber layer, an upper thread layer made of braided upper threads, and a skin rubber layer. The lower thread layer is constituted by lower threads each having a first adhesive thin film adhesively bonded to the inner tube layer and to the intermediate rubber layer. The upper thread layer is constituted by upper threads each having a second adhesive thin film adhesively bonded to the intermediate rubber layer and to the skin rubber layer.

11 Claims, 5 Drawing Sheets

FIG. 7

| | | UPPER THREAD | | LOWER THREAD | DURABILITY | | AMOUNT OF VOLUME EXPANSION (cc/ft) |
|---|---|---|---|---|---|---|---|
| | | DIPPING PROCESS | RFL PROCESS (wt%) | RFL PROCESS (wt%) | FATIGUE RESISTANCE (×10⁵) | STIFFNESS VALUE | |
| EMBODIMENT | SAMPLE 1 | ABSENT | 2.5 | 2.0 | 100 | 0.9722 | 0.24 |
| | SAMPLE 2 | PRESENT | ABSENT | ABSENT | 100 | 1 | 0.275 |
| COMPARATIVE EXAMPLE | SAMPLE 3 | PRESENT | ABSENT | 2.0 | 20 | 1.2778 | 0.222 |
| | SAMPLE 4 | ABSENT | 2.5 | ABSENT | 100 | 0.5556 | 0.35 |

BRAKE HOSE

BACKGROUND OF THE INVENTION

1. Field of the Invention

The present invention relates to a brake hose, such as an oil pressure hose, or the like, having reinforcing thread layers braided intermediately for use in a flow path for a pressure fluid.

The present application is based on Japanese Patent Application No. Hei. 10-230341, which is incorporated herein by reference.

2. Description of the Related Art

Heretofore, for example, a brake hose shown in FIG. 8 is known as brake hose of this type. FIG. 8 is a sectional view showing a brake hose 100. The brake hose 100 is constituted by lamination of an inner tube layer 102, a lower thread layer 104, an intermediate rubber layer 106, an upper thread layer 108 and a skin rubber layer 110 successively in outward order from a flow path 101 for making an operating fluid flow. To produce the brake hose 100, first, an EPDM rubber material is extrusion-molded annularly to form the inner tube layer 102. Lower threads are then braided by a braider to form the lower thread layer 104. A sheet-like rubber material is then wound on the lower thread layer 104. Upper threads are then braided to form the upper thread layer 108. A dipping process is then carried out so that an adhesive agent is applied onto the upper thread layer 108. After the adhesive layer is dried, a rubber material is extruded onto the upper thread layer 108 to thereby laminate the skin rubber layer 110 on the upper thread layer 108. Further, a vulcanizing process and a predetermined after-process are carried out to thereby complete the brake hose 100. In the brake hose 100, the two layers, that is, the lower and upper thread layers 104 and 108 are buried in a rubber base in order to enhance pressure resistance. Furthermore, the adhesive agent layer 109 is applied onto the upper thread layer 108 to thereby enhance the bonding strength between the upper thread layer 108 and the skin rubber layer 110 to thereby enhance the pressure resistance.

Although the adhesive agent layer 109 has an effect of enhancing the bonding strength of the upper thread layer 108, etc. on one hand, the adhesive agent layer 109 makes the stiffness of the brake hose 100 per se high on the other hand. If the stiffness of the brake hose 100 is made high, it becomes difficult to bend the brake hose 100 smoothly in response to the motion of a tire. There was a problem that durability was spoiled.

In the case where the amount of application of the adhesive agent layer is reduced to decrease the stiffness to cope with the aforementioned problem, the amount of volume expansion of the brake hose 100 increases to spoil the brake feeling when the pressure of an operating fluid is applied to the inside of the brake hose 100. Thus, durability decreases as the stiffness of the brake hose 100 increases, while the amount of volume expansion of the brake hose 100 increases to spoil the brake feeling as the stiffness decreases. There was therefore a problem that it was difficult to make the two consistent with each other.

SUMMARY OF THE INVENTION

The present invention is designed to solve the problems in the background art and it is an object thereof to provide a brake hose in which both enhancement of durability and reduction of the amount of volume expansion are made consistent with each other.

In order to achieve the foregoing object, according to the present invention, a brake hose is provided, which comprises an inner tube layer which is made from a rubber material for forming a flow path for making a pressure fluid flow, a lower thread layer formed on the inner tube layer by braiding lower threads, an intermediate rubber layer made from a rubber material and laminated on the lower thread layer, an upper thread layer formed on the intermediate rubber layer by braiding upper threads, and a skin rubber layer laminated on the upper thread layer. The lower thread layer is made from lower threads each having a first adhesive thin film adhesively bonded to the inner tube layer and to the intermediate rubber layer, and the upper thread layer is made from upper threads each having a second adhesive thin film adhesively bonded to the intermediate rubber layer and to the skin rubber layer.

In the brake hose according to the present invention, the lower thread layer formed between the inner tube layer and the intermediate rubber layer and the upper thread layer formed between the intermediate rubber layer and the skin rubber layer form two reinforcing thread layers in a rubber base so that strength to withstand the high pressure of a pressure fluid flowing in the flow path is given to the brake hose per se. Further, each of lower threads constituting the lower thread layer has a first adhesive thin film. The first adhesive thin films are adhesively bonded to the inner tube layer and to the intermediate rubber layer to thereby prevent thread displacement. At the same time, the first adhesive thin films are adhesively bonded to one another in lower thread-overlap portions to thereby enhance the integration of the lower thread layer to suppress the expansion of the inner tube layer caused by the inner pressure. Accordingly, the amount of volume expansion of the brake hose per se is suppressed to thereby improve the brake feeling.

On the other hand, each of upper threads constituting the upper thread layer has a second adhesive thin film. The second adhesive thin films are adhesively bonded to the intermediate rubber layer and to the skin rubber layer to thereby prevent thread displacement. Furthermore, the upper threads are adhesively bonded to one another through the second adhesive thin films to thereby enhance the integration of the upper thread layer. Accordingly, a pressure fluid leaked out of an end portion of the brake hose is prevented from penetrating in between the intermediate rubber layer and the skin rubber layer. Furthermore, the upper thread layer is formed so that the upper threads are adhesively bonded to one another through the second adhesive thin films. Accordingly, the upper thread layer per se is prevented from becoming hard unlike the adhesive layer formed by the dipping process as described in the background art. Accordingly, the stiffness of the brake hose per se can be reduced to thereby improve both fatigue resistance and durability.

Further, as a preferred mode of the lower threads, each of the lower threads has a filament bundle constituted by a plurality of first filament threads tied up in a bundle, and the lower thread can be achieved by the formation of the first adhesive thin film on the outer surface of the filament bundle. For example, each of the lower threads can be prepared by the steps of: tying up about 200 to about 400 filament threads in a bundle; applying an undercoat layer onto the bundle; and applying an RFL process to the bundle. The lower threads are braided on the inner tube layer to thereby form the lower thread layer. In this case, the lower threads are adhesively bonded to one another through the first adhesive thin films. Accordingly, there is a large force for suppressing the expansion of the diameter of the inner tube layer due to the pressure of an operating fluid in the flow path.

Here, as the first adhesive thin film, a film having a large adhesive force to EPDM can be formed by an RFL process. The RFL process used herein means a process in which adhesive thin film acting as an adhesive agent containing resorcin-formaldehyde-latex resin and rubber latex as main components is applied on a surface of thread. That is, with respect to each of the lower threads, an adhesive thin film having a large adhesive force to a rubber material can be formed by the RFL process, so that a large adhesive force to the inner tube layer and to the intermediate rubber layer can be obtained by the adhesive thin film.

Further, as a preferred mode of the upper threads, each of the upper threads can be achieved by the steps of: forming adhesive thread having a second adhesive thin film obtained by applying an undercoat layer onto filament thread and applying an RFL process to the filament thread; and twisting 200 to 400 pieces of the adhesive thread. Because the second adhesive thin film is formed in accordance with each adhesive thread, the adhesive thread is expanded relatively flexibly so as not to increase the stiffness of the brake hose when the adhesive thread is interposed between the intermediate rubber layer and the skin rubber layer.

Incidentally, as a preferred material for filament fiber thread in the upper and lower threads, it is possible to use polyester while utilizing its large elastic characteristic.

Features and advantages of the invention will be evident from the following detailed description of the preferred embodiments described in conjunction with the attached drawings.

BRIEF DESCRIPTION OF THE DRAWINGS

In the accompanying drawings:

FIG. 7 is an explanatory view for explaining conditions and results of tests for an embodiment and comparative examples.

DETAILED DESCRIPTION OF THE PREFERRED EMBODIMENTS

A preferred embodiment of the present invention will be described below to make the aforementioned configuration and operation of the present invention clearer.

Figure 1:
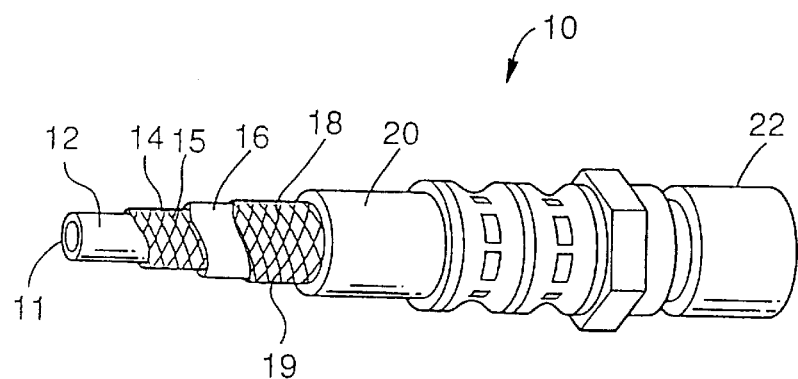
FIG. 1 is a partly cutaway perspective view of a brake hose according to an embodiment of the present invention.
Figure 2:
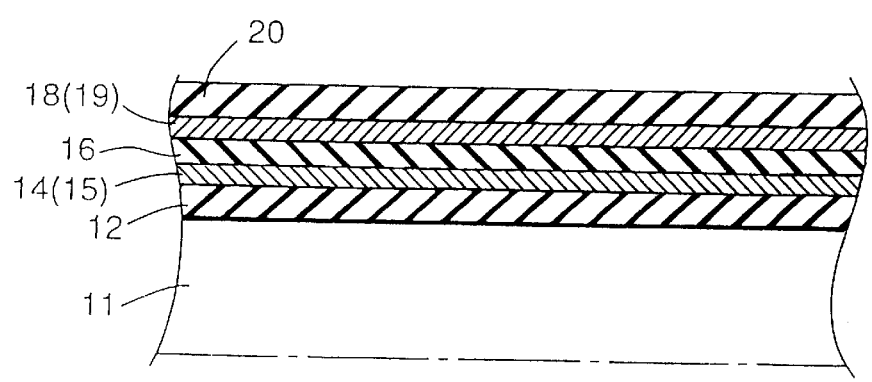
FIG. 2 is a half-sectional view of the brake hose.

FIG. 1 is a partly cutaway perspective view of a brake hose 10 according to an embodiment of the present invention. FIG. 2 is a sectional view of the brake hose 10. In FIGS. 1 and 2, the brake hose 10 is a hose used for supplying a brake pressure fluid between a master cylinder and a brake cylinder in a car. The brake hose 10 comprises an inner tube layer 12 which forms a flow path 11, a lower thread layer 14 braided on the inner tube layer 12, an intermediate rubber layer 16 applied onto a surface of the lower thread layer 14, an upper thread layer 18 braided on a surface of the intermediate rubber layer 16, and a skin rubber layer 20 applied onto a surface of the upper thread layer 18. A mouthpiece 22 is fastened to an end portion of the brake hose 10 by caulking.

The inner tube layer 12 is constituted by a rubber tube body made from EPDM (ethylene-propylene-diene terpolymer) or SBR (styrene-butadiene rubber). The flow path 11 is formed in the inside of the rubber tube body. The inner diameter of the rubber tube body is set to be in a range of from 3.0 to 3.4 mm. The thickness of the rubber tube body is set to be in a range from 0.5 to 1.0 mm. Further, the intermediate rubber layer 16 is made from EPDM, NR (natural rubber), or the like. The thickness of the intermediate rubber layer 16 is set to be in a range of from 0.1 to 0.2 mm. The skin rubber layer 20 is made from EPDM, CR (chloroprene rubber), or the like. The thickness of the skin rubber layer 20 is set to be in a range of from 0.5 to 1.0 mm.

Figure 3:
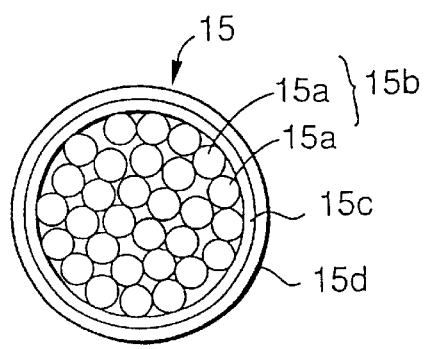
FIG. 3 is an explanatory view for explaining one of lower threads in enlarged section.

The lower thread layer 14 is constituted by braided lower threads 15. FIG. 3 is an enlarged sectional view showing one of the lower threads 15. Each of the lower threads 15 is constituted by a filament bundle 15*b* composed of 200 to 400 filament threads 15*a* tied up in a bundle, an undercoat layer 15*c* applied onto the outer circumference of the filament bundle 15*b*, and a first adhesive thin film 15*d* formed on the undercoat layer 15*c*. Incidentally, hundreds of filament threads 15*a* contained in the filament bundle 15*b* are shown as several filament threads 15*a* in FIG. 3 for the sake of simplification.

The lower threads 15 are produced by the following process. That is, about 200 to about 400 filament threads 15*a* each made from polyester and having a thickness of 3.75 to 6 deniers are tied up in a bundle to thereby form a filament bundle 15*b*. An undercoat adhesive agent is then applied onto the filament bundle 15*b* to thereby form an undercoat layer 15*c*. Epoxy resin, or the like, may be used as the undercoat adhesive agent. A first adhesive thin film 15*d* is then formed on the undercoat layer 15*c* by a process shown in FIG. 4. The first adhesive thin film 15*d* is provided as an adhesive layer which is formed by an RFL process in order to enhance the adhesive force of the lower thread 15 to the inner tube layer 12 and to the intermediate rubber layer 16.

Figure 4:
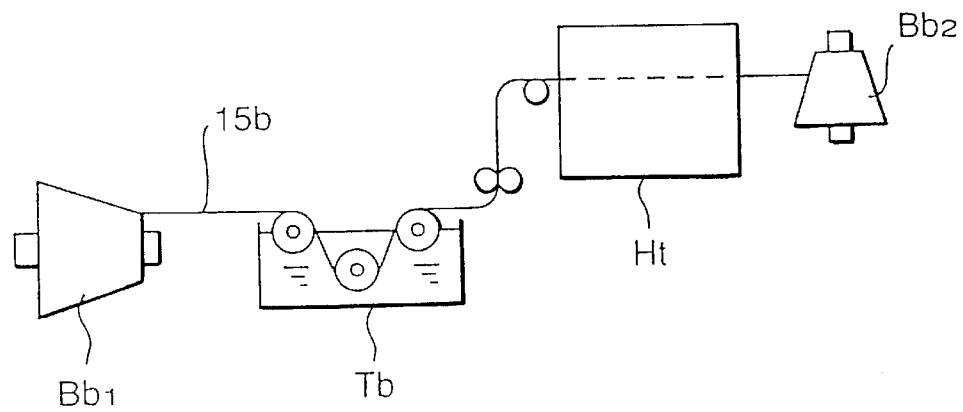
FIG. 4 is an explanatory view for explaining a step for applying a first adhesive thin film.

In FIG. 4, the filament bundle 15*b* coated with the undercoat layer 15*c* is let to pass through an RFL solution in a liquid tank Tb, dried in a dry furnace Ht and wound up on a bobbin Bb2. The RFL process used herein means a process in which fiber thread is immersed in an RFL adhesive solution as an organic fiber cord adhesive agent and then dried to form an adhesive film. The RFL adhesive solution is a mixture solution of an aqueous solution of resorcin-formaldehyde precondensate, and rubber latex. The aqueous solution of resorcin-formaldehyde precondensate may be prepared by a reaction of 0.75 to 0.8 mol of formaldehyde to 1 mol of resorcin in basic catalyst at a temperature near the room temperature. A basic substance such as sodium hydroxide, ammonium hydroxide, or the like, is preferably used as the basic catalyst. Natural rubber latex or synthetic rubber latex may be used as the rubber latex. For example, styrene-butadiene copolymeric rubber latex, vinylpyridine-butadiene-styrene copolymeric rubber latex, or the like, may be used as the synthetic rubber latex. Incidentally, it is preferable, in terms of adhesive strength and later-described moderate stiffness of the brake hose 10 per se that the amount of the first adhesive thin film 15*d* is set to be in a range of from 0.5 to 2.5% by weight with respect to the total weight of the filament threads 15*a*.

Figure 5:
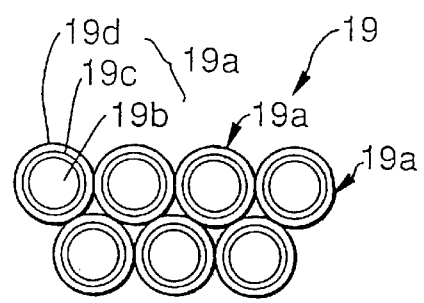
FIG. 5 is an explanatory view for explaining a part of upper threads in enlarged section.

The upper thread layer 18 is formed of braided upper threads 19. FIG. 5 is an enlarged sectional view showing a part of the upper threads 19. The upper threads 19 are formed by tying up 200 to 400 adhesive coated threads 19a in a bundle. Each of the adhesive coated threads is formed as follows. A filament thread 19b made from polyester and having a thickness of 3.75 to 6 deniers is coated with an undercoat layer to thereby form an undercoat layer 19c. A second adhesive thin film constituted by an RFL layer is formed on the undercoat layer 19c to thereby produce an adhesive coated thread 19a. The second adhesive thin film 19d is provided as an adhesive thin film for enhancing the adhesive force of the upper thread 19 to the intermediate rubber layer 16 and to the skin rubber layer 20 of EPDM rubber. The RFL process is the same process as applied to the lower threads 15 except that the process is applied to the filament threads 19b directly. 200 to 400 pieces of the adhesive coated thread 19a obtained by the aforementioned process are twisted to form the upper threads 19. Incidentally, in terms of adhesive strength and moderate or not-so-high stiffness of the brake hose 10 per se which will be described later, it is preferable that the amount of the second adhesive thin film 19d be set to a range from 2 to 4% by weight with respect to the total weight of the filament threads 19b.

Figure 6:
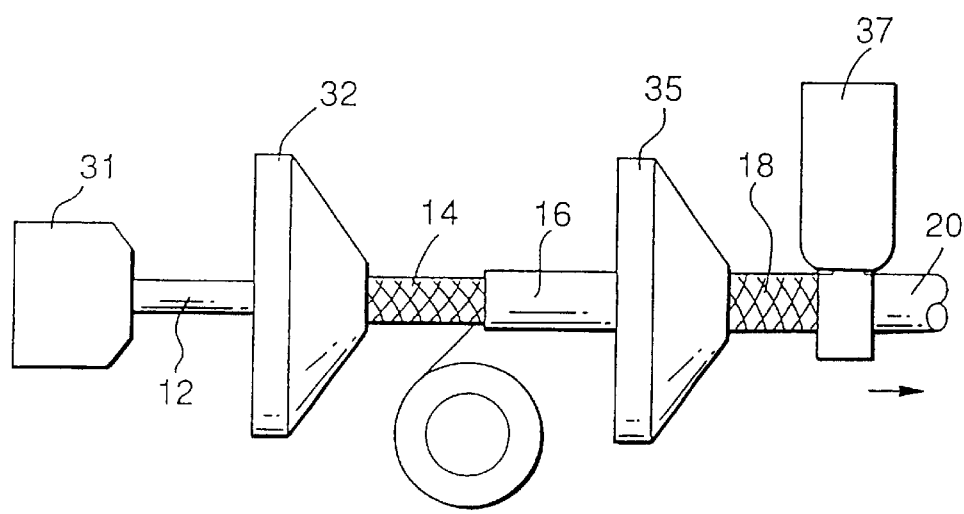
FIG. 6 is an explanatory view for explaining a process for producing the brake hose.
Figure 8:
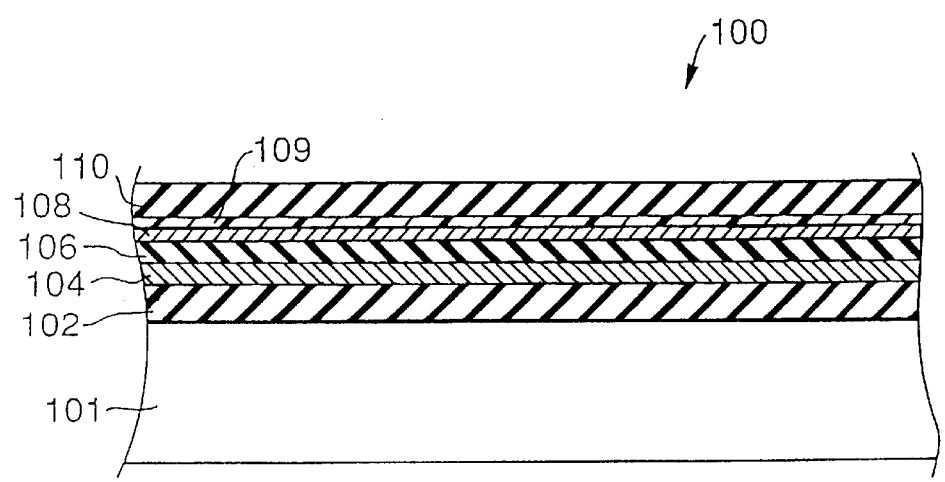
FIG. 8 is a half-sectional view of a background-art brake hose.

A series of steps in producing the brake hose 10 will be described below. FIG. 6 is an explanatory view showing a process for producing the brake hose 10. In FIG. 6, first, EPDM rubber is extruded by a first extruder 31 to thereby form an inner tube layer 12. The aforementioned lower threads 15 are then braided on the extruded inner tube layer 12 by a first braider 32 to thereby form a lower thread layer 14. An intermediate rubber layer 16 is then formed so as to cover the lower thread layer 14. The intermediate rubber layer 16 is made from a sheet rubber material rolled up on the lower thread layer 14. Upper threads 19 are then braided by a second braider 35 to thereby form an upper thread layer 18 on the intermediate rubber layer 16. EPDM rubber is then extruded onto the upper thread layer 18 by a second extruder 37 to thereby form a skin rubber layer 20.

A vulcanizing step is then carried out in an ordinary condition. For example, vulcanization is carried out at a temperature of approximately 145° C. to 165° C. for about 15 to 60 minutes. In the vulcanizing step, the inner tube layer 12, the intermediate rubber layer 16 and the skin rubber layer 20 are bonded to one another by means of ordinary vulcanizing adhesive bonding. At the same time, the lower threads 15 of the lower thread layer 14 are adhesively bonded to the inner tube layer 12 and to the intermediate rubber layer 16 by heat at the time of vulcanization through the first adhesive thin film 15d formed by the RFL process. Furthermore, the upper threads 19 of the upper thread layer 18 are adhesively bonded to the intermediate rubber layer 16 and to the skin rubber layer 20 by heat at the time of vulcanization through the second adhesive thin film 19d. Thus, the brake hose 10 is integrally formed.

In the aforementioned brake hose 10, the lower and upper thread layers 14 and 18 form two reinforcing thread layers in a rubber base, so that strength to withstand the high pressure of a pressure fluid flowing in the flow path 11 can be given to the brake hose 10 per se.

Further, the lower threads 15 have the first adhesive thin film 15d, respectively, which are formed by the RFL process through the undercoat layer 15c after 200 to about 400 filament threads 15a are tied up in a bundle. Accordingly, the lower threads 15 are firmly adhesively bonded to the inner tube layer 12 and to the intermediate rubber layer 16 through the first adhesive thin film 15d to thereby prevent thread displacement. Further, the lower threads 15 are adhesively bonded to one another through the first adhesive thin films 15d to thereby enhance the integration of the lower thread layer 14. Accordingly, the expansion of the inner tube layer 12 due to the pressure of an operating fluid in the flow path 11 is suppressed, that is, the amount of volume expansion of the brake hose 10 per se is reduced so that the brake feeling can be improved. Furthermore, the first adhesive thin film 15d is provided as a film having a large adhesive force to EPDM by the RFL process. Accordingly, it is possible to obtain a large adhesive force of the first adhesive thin film 15d to the inner tube layer 12 and to the intermediate rubber layer 16.

Further, the upper threads 19 constituting the upper thread layer 18 are firmly adhesively bonded to the intermediate rubber layer 16 and to the skin rubber layer 20 through the second adhesive thin films 19d formed by the RFL process. Accordingly, thread displacement can be prevented. Further, the upper threads 19 are adhesively bonded to one another through the second adhesive thin films 19d to thereby form the upper thread layer 18 having a braid structure. Accordingly, a pressure fluid leaked out of an end portion of the brake hose 10 is prevented from penetrating in between the intermediate rubber layer 16 and the skin rubber layer 20. Further, since upper threads 19 made of twisted adhesive threads 19a so as to expand relatively flexibly are used, the upper thread layer 18 is not so hard as the adhesive layer formed by the dipping process as described in the background art. Accordingly, the stiffness of the brake hose 10 per se can be reduced, so that both the fatigue resistance and durability can be improved.

A durability test of the brake hose and a test concerning the amount of volume expansion thereof were made as follows. FIG. 7 shows the conditions and results of the tests. In FIG. 7, sample 1 shows an embodiment shown in FIG. 1, or the like, and samples 2 to 4 show comparative examples to be compared in effect with the embodiment. Of these, sample 2 is an example described in the background art. In the samples 1 to 4, the rubber material was EPDM; the outer diameter and length of the brake hose were selected to be 10.5 mm and 305 mm respectively; the inner diameter and thickness of the inner tube layer were selected to be 3.2 mm and 0.8 mm respectively; the thickness of the intermediate rubber layer was selected to be 0.2 mm; and the thickness of the skin rubber layer was selected to be 0.8 mm. Further, polyester (PET) fiber was used in the lower and upper threads. Further, in the samples 1 and 3, epoxy resin was used in the undercoat layer applied onto each of the lower and upper threads, and the amount of the epoxy resin was selected to be 0.3% by weight with respect to the weight of fiber. In the samples 2 and 3, a process (dipping process) of immersing the upper thread layer in a solution of an adhesive agent to thereby apply an adhesive layer onto the upper thread layer was carried out.

The durability test was carried out by a combination of a fatigue resistance test and a stiffness test. In the fatigue resistance test, the number of repeated bending up to the breakdown of the brake hose was examined while the brake hose was exposed to the ordinary temperature and bent repeatedly in the condition that brake oil was pressurized in 100 kgf/cm$^2$. Incidentally, the upper limit of the number of repeated bending to the breakdown was set to be 1,000,000. On the other hand, in the stiffness test, the load required for bending the brake hose by a predetermined amount was examined and the relative specific load to the sample 2 (background-art article) was expressed as a stiffness value. Incidentally, the stiffness value was substantially in inverse proportion to the number of repeated bending to the breakdown in the fatigue resistance test. Further, in the volume expansion test, the quantity of the change of the content was examined when the content was pressurized with 105 kgf/cm$^2$.

As shown in FIG. 7, from comparison between the sample 1 according to the embodiment and the sample 2 according to the background art in the results of the aforementioned tests, it is apparent that the sample 1 is more excellent than the sample 2 because the stiffness value in the sample 1 is so small that the durability can be improved, and the amount of volume expansion in the sample 1 is so small that the brake feeling can be improved. In comparison between the sample 1 and the sample 3 in which the dipping process is applied onto the upper thread layer, it is apparent that the amount of volume expansion can be reduced but the durability is lowered in the sample 3. Further, in comparison between the sample 1 and the sample 4 in which there is no adhesively bonding process applied to the lower thread layer, it is apparent that the durability can be enhanced but the amount of volume expansion increases to spoil the brake feeling in the sample 4. As described above, in accordance with the embodiment shown in the sample 1, the fatigue resistance can be enhanced and the amount of volume expansion can be reduced so that the brake feeling can be improved.

Incidentally, the present invention is not limited to the aforementioned embodiment but may be carried out in various modes without departing from the gist thereof.

What is claimed is:

1. A brake hose comprising:
    an inner tube layer made from a rubber material for forming a flow path in which a pressure fluid flows;
    a lower thread layer formed on said inner tube layer by braiding lower threads;
    an intermediate rubber layer made from a rubber material and laminated on said lower thread layer;
    an upper thread layer formed on said intermediate rubber layer by braiding upper threads; and
    a skin rubber layer laminated on said upper thread layer, wherein said lower thread layer is made from lower threads having a first adhesive thin film bonded to said inner tube layer and to said intermediate rubber layer, and said upper thread layer is made from upper threads having a second adhesive thin film bonded to said intermediate rubber layer and to said skin rubber layer, said upper threads being formed by twisting a plurality of adhesive coated threads, each of which is formed of a second filament thread with said second adhesive thin film formed thereon, and each of said lower threads has a filament bundle including a plurality of first filament threads tied up in a bundle, said first adhesive thin film is formed on an outer surface of said filament bundle.

2. A brake hose according to claim 1, wherein each of said first and second filament threads are made from a polyester fiber thread.

3. A brake hose according to claim 2, wherein each of said first and second filament threads is made from a polyester fiber thread having a thickness of 3.75 to 6 deniers.

4. A brake hose according to claim 1, wherein each of said first and second adhesive thin films is formed by an RFL process.

5. A brake hose according to claim 1, wherein each of said filament bundle of said lower thread is formed of 200 to 400 said first filament threads, and an undercoat layer is formed between the outer surface of said filament bundle and said first adhesive thin film.

6. A brake hose according to claim 5, wherein said undercoat layer comprises epoxy resin.

7. A brake hose according to claim 1, wherein an amount of said first adhesive thin film is in a range from 0.5 to 2.5% by weight with respect to a total weight of said first filament threads.

8. A brake hose according to claim 1, wherein each of said upper threads is formed by twisting 200 to 400 pieces of said adhesive coated threads.

9. A brake hose according to claim 1, wherein an amount of said second adhesive thin film is in a range from 2 to 4% by weight with respect to a total weight of said second filament threads.

10. A brake hose comprising:
    an inner tube layer made from a rubber material for forming a flow path in which a pressure fluid flows;
    a lower thread layer formed on said inner tube layer by braiding lower threads;
    an intermediate rubber layer made from a rubber material and laminated on said lower thread layer;
    an upper thread layer formed on said intermediate rubber layer by braiding upper threads; and
    a skin rubber layer laminated on said upper thread layer, wherein said lower thread layer is made from lower threads having a first adhesive thin film bonded to said inner tube layer and to said intermediate rubber layer, and said upper thread layer is made from upper threads having a second adhesive thin film bonded to said intermediate rubber layer and to said skin rubber layer, wherein each of said lower threads has a filament bundle including a plurality of first filament threads tied up in a bundle, and said first adhesive thin film is formed on an outer surface of said filament bundle, each of said filament bundle of said lower thread is formed of 200 to 400 said first filament threads, and an undercoat layer is formed between the outer surface of said filament bundle and said first adhesive thin film.

11. A brake hose comprising:
    an inner tube layer made from a rubber material for forming a flow path in which a pressure fluid flows;
    a lower thread layer formed on said inner tube layer by braiding lower threads;
    an intermediate rubber layer made from a rubber material and laminated on said lower thread layer;
    an upper thread layer formed on said intermediate rubber layer by braiding upper threads; and
    a skin rubber layer laminated on said upper thread layer, wherein said lower thread layer is made from lower threads having a first adhesive thin film bonded to said inner tube layer and to said intermediate rubber layer, and said upper thread layer is made from upper threads having a second adhesive thin film bonded to said intermediate rubber layer and to said skin rubber layer, wherein each of said lower threads has a filament bundle including a plurality of first filament threads tied up in a bundle, and said first adhesive thin film is formed on an outer surface of said filament bundle, and wherein an amount of said first adhesive thin film is in a range from 0.5 to 2.5% by weight with respect to a total weight of said first filament threads.

\* \* \* \* \*